(12) United States Patent
Carlough et al.

(10) Patent No.: US 9,128,759 B2
(45) Date of Patent: Sep. 8, 2015

(54) DECIMAL MULTI-PRECISION OVERFLOW AND TININESS DETECTION

(71) Applicant: International Business Machines Corporation, Armonk, NY (US)

(72) Inventors: Steven R. Carlough, Poughkeepsie, NY (US); Adam B. Collura, Hyde Park, NY (US); Michael K. Kroener, Ehningen (DE); Silvia M. Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 13/686,135

(22) Filed: Nov. 27, 2012

(65) Prior Publication Data

US 2014/0149481 A1    May 29, 2014

(51) Int. Cl.
*G06F 7/494* (2006.01)
*G06F 7/491* (2006.01)

(52) U.S. Cl.
CPC ...... *G06F 7/4912* (2013.01); *G06F 2207/4922* (2013.01)

(58) Field of Classification Search
None
See application file for complete search history.

(56) References Cited

U.S. PATENT DOCUMENTS

| | | | | |
|---|---|---|---|---|
| 3,935,438 A | * | 1/1976 | Grupe | 708/673 |
| 5,550,767 A | * | 8/1996 | Taborn et al. | 708/498 |
| 5,553,015 A | * | 9/1996 | Elliott et al. | 708/498 |
| 5,745,399 A | * | 4/1998 | Eaton et al. | 708/673 |
| 6,631,392 B1 | * | 10/2003 | Jiang et al. | 708/498 |
| 7,912,890 B2 | | 3/2011 | Cornea-Hasegan | 708/623 |
| 8,126,954 B2 | | 2/2012 | Cornea-Hasegan | 708/493 |
| 2009/0216824 A1 | | 8/2009 | Weinberg et al. | 708/504 |
| 2009/0240753 A1 | | 9/2009 | Carlough et al. | 708/230 |
| 2011/0214042 A1 | | 9/2011 | Lundvall et al. | 714/807 |

OTHER PUBLICATIONS

Akkas et al., "A Decimal Floating-Point Fused Multiply-Add Unit With A Novel Decimal Leading-Zero Anticipator," IEEE International Conference on Application-Specific Systems, Architectures and Processors, Santa Monica, CA, Sep. 2011, pp. 43-50.
Hickman et al., "A Parallel IEEE P754 Decimal Floating-Point Multiplier," IEEE $25^{th}$ International Conference on Computer Design, Lake Tahoe, CA, Oct. 2007, pp. 296-303.
Raafat et al., "A Decimal Fully Parallel and Pipelined Floating Point Multiplier," IEEE $42^{nd}$ Asilomar Conference on Signals, Systems, and Computers, Pacific Grove, CA, Oct. 2008, pp. 1800-1804.
Wang et al., "Hardware Designs for Decimal Floating-Point Addition and Related Operations," IEEE Transactions on Computers, vol. 58, Issue 3, Mar. 2009, pp. 322-335.

* cited by examiner

*Primary Examiner* — David H Malzahn
(74) *Attorney, Agent, or Firm* — VanLeeuwen & VanLeeuwen; Thomas E. Tyson

(57) ABSTRACT

An approach is provided in which a processor includes an adder that concurrently generates one or more intermediate results and a boundary indicator based upon instructions retrieved from a memory area. The boundary indicator indicates whether a collective result generated from the intermediate results is within a boundary precision value.

25 Claims, 8 Drawing Sheets

US 9,128,759 B2

DECIMAL MULTI-PRECISION OVERFLOW AND TININESS DETECTION

BACKGROUND

The present disclosure relates to a decimal adder that concurrently generates intermediate results and a boundary indicator that indicates whether a collective result generates an overflow condition or an underflow condition.

Processors typically perform two types of arithmetic operations, which are fixed-point operations and floating-point operations. Fixed-point operations process numbers (e.g., add, subtract, multiply, divide) that have a fixed number of digits before or after a radix point (e.g., decimal point). Floating-point operations process numbers that are represented approximately to a fixed number of significant digits and scaled using an exponent. The term "floating point" refers to the fact that the radix point "floats" relative to the significant digits of a number.

Situations arise in fixed-point operations when a result causes an "overflow" condition. An overflow occurs when a calculation produces a result that is greater in magnitude than a given register or storage location is allocated to store or represent. Likewise, situations arise in floating-point operations that cause an "underflow" condition. An underflow occurs when a calculation's result is smaller in magnitude (e.g., closer to zero) than a smallest value representable as a normal floating point number in the given register or storage location.

BRIEF SUMMARY

According to one embodiment of the present disclosure, an approach is provided in which a processor includes an adder that concurrently generates one or more intermediate results and a boundary indicator based upon instructions retrieved from a memory area. The boundary indicator indicates whether a collective result generated from the intermediate results is within a boundary precision value.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
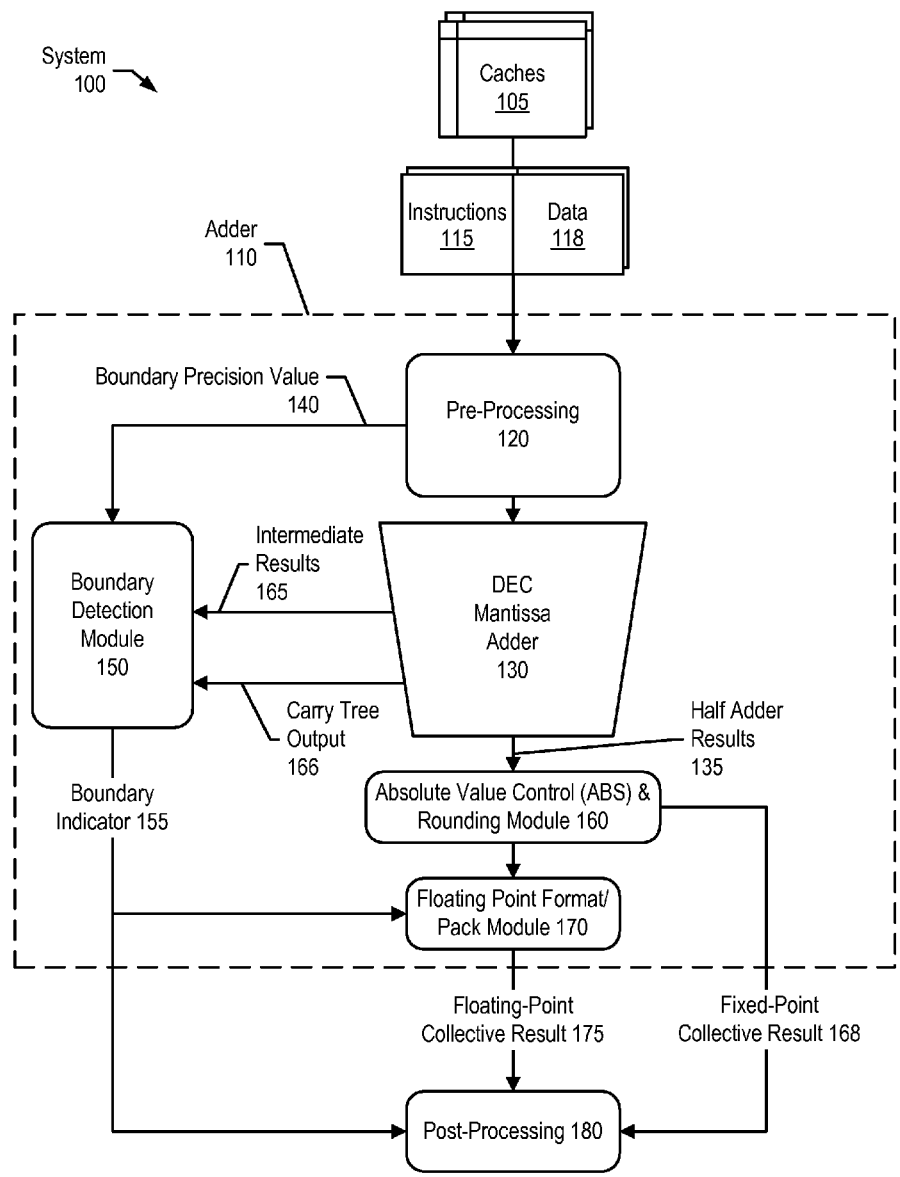
FIG. 1 is a diagram showing an adder that concurrently generates intermediate results and a boundary indicator.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing an adder that concurrently generates intermediate results and a boundary indicator that indicates whether a collective result generated from the intermediate results creates an overflow condition or underflow condition during fixed-point operations or floating-point operations, respectively.

System 100 includes adder 110 that, in one embodiment, provides overflow detection for fixed-point Storage-Storage-Decimal (SSD) addition and subtraction operations. In this embodiment, adder 110 receives instructions 115 and data 118 from caches 105 (e.g., instruction cache and data cache), and extracts a target results length from instructions 115. The target results length specifies a number of non-zero bytes that a fixed-point operation's collective result (e.g., summation of two numbers) is permitted (e.g., 8 bytes).

Figure 4:
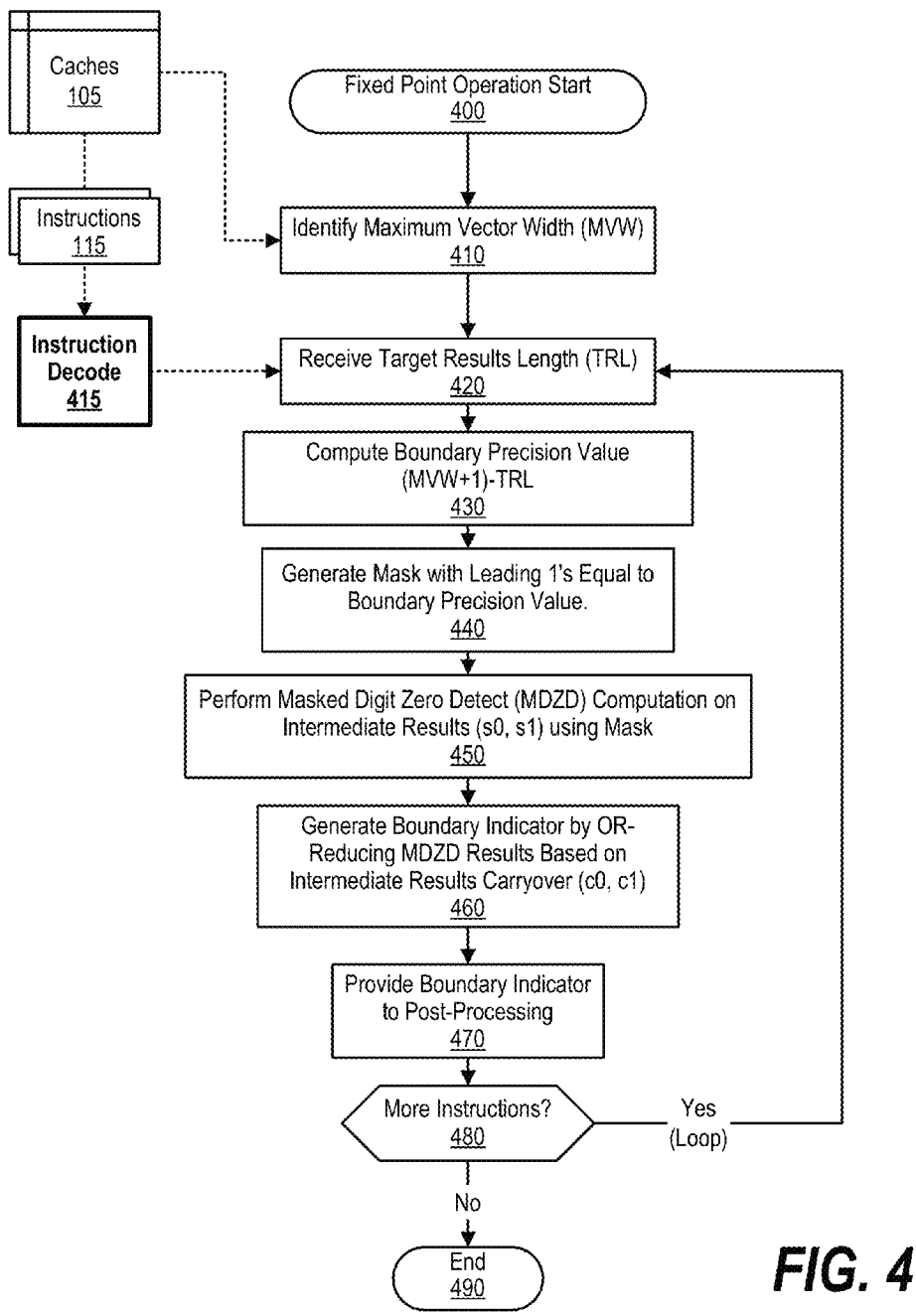
FIG. 4 is a flowchart showing steps taken during a fixed-point arithmetic operation to identify an overflow condition.

Pre-processing 120 uses the target results length and a maximum vector width (corresponding to system 100's configuration) to generate boundary precision value 140, which indicates the amount of leading zeros permitted in the collective result, which is determined by analyzing intermediate results 165 (see FIG. 4 and corresponding text for further details). For fixed-point operations, boundary precision value 140 corresponds to the "minimum" amount of leading zeros permitted in the collective result (fixed-point collective result 168).

In another embodiment, adder 110 provides underflow detection for various p Decimal Floating Point (DFP) standard formats, such as DFP-32, DFP-64, and DFP-128. Pre-processing 120 identifies a mantissa width from instructions 115 and computes an underflow boundary from data 118. In turn, pre-processing 120 computes boundary precision value 140 based upon the mantissa width and the underflow boundary (see FIG. 5 and corresponding text for further details). In this embodiment, data 118 includes exponent information of the operand data that is used to determine the exponent information of the result. If "$E_{min}$" is a smallest possible result exponent (based on the format that is determined from instructions 115) in the format, and "$E_{result}$" is the exponent of the result, then an underflow condition exists if the result mantissa includes more leading zeros than $E_{result}-E_{min}$. The number of leading zeros in the mantissa is determined by the format width (based on the format that is determined from instructions 115) and the number of non-zero result digits in the mantissa. As such, for floating point operations, boundary precision value 140 corresponds to the "maximum" amount of leading zeros permitted in the collective result (floating-point collective result 175).

Adder 110 utilizes various modules to determine overflow conditions and underflow conditions prior to the generation of the collective results. Pre-processing module 120 receives instructions 115 and data 118 from caches 105 (e.g., instruction cache and data cache) and generates boundary precision value 140 discussed herein based upon whether instructions 115 are fixed point instructions or floating point instructions. In addition, pre-processing module 120 passes data values to process (e.g., add/subtract) to Decimal End-a-round Carry (DEC) mantissa adder 130.

DEC mantissa adder 130 generates intermediate results 165 from the data values using, for example, four-bit compound adders and six correction/muxing modules. Boundary detection module 150 receives intermediate results 165 that may be, for example, corrected digit sums in the form of sum arrays and corrected digit carryovers in the form of carryover arrays. As one skilled in the art can appreciate, although "arrays" are discussed herein, the digit values included in the arrays may be processed on an individual basis (see FIG. 2 and corresponding text for further details). DEC Mantissa adder 130 also generates carry tree output 166, which boundary detection module 150 utilizes during the boundary indicator generation process (see FIG. 2 and corresponding text for further details).

Boundary detection module 150 generates a mask according to boundary precision value 140 and combines the mask with intermediate results 165 to generate boundary indicator 155, which indicates an overflow or underflow condition. In one embodiment, the mask includes 1's in leading digit locations that correspond to the amount of zeros permitted in the operation's collective result. In one embodiment, intermediate results 165 and boundary indicator 155 are generated during the same clock cycle (see FIG. 2 and corresponding text for further details).

DEC mantissa adder 130 provides half-adder results 135 (generated from intermediate results 165) to absolute value control (ABS) and rounding 160. When instructions 115 correspond to a fixed-point operation, ABS and rounding module 160 produce fixed-point collective result 168 and send it to post-processing 180. In turn, post-processing 180 uses boundary indicator 155 to determine whether fixed-point collective result 168 generates an overflow condition.

When instructions 115 correspond to a floating point operation, ABS and rounding module 160 send floating-point information (e.g., mantissa and exponent generated from intermediate results 165) to floating-point format/pack module 170. Floating-point format/pack module 170 generates floating-point collective result 175 based upon the floating-point information and boundary indicator 155. In turn, floating-point collective result 175 is sent to post-processing module 180 for further processing.

Figure 2:
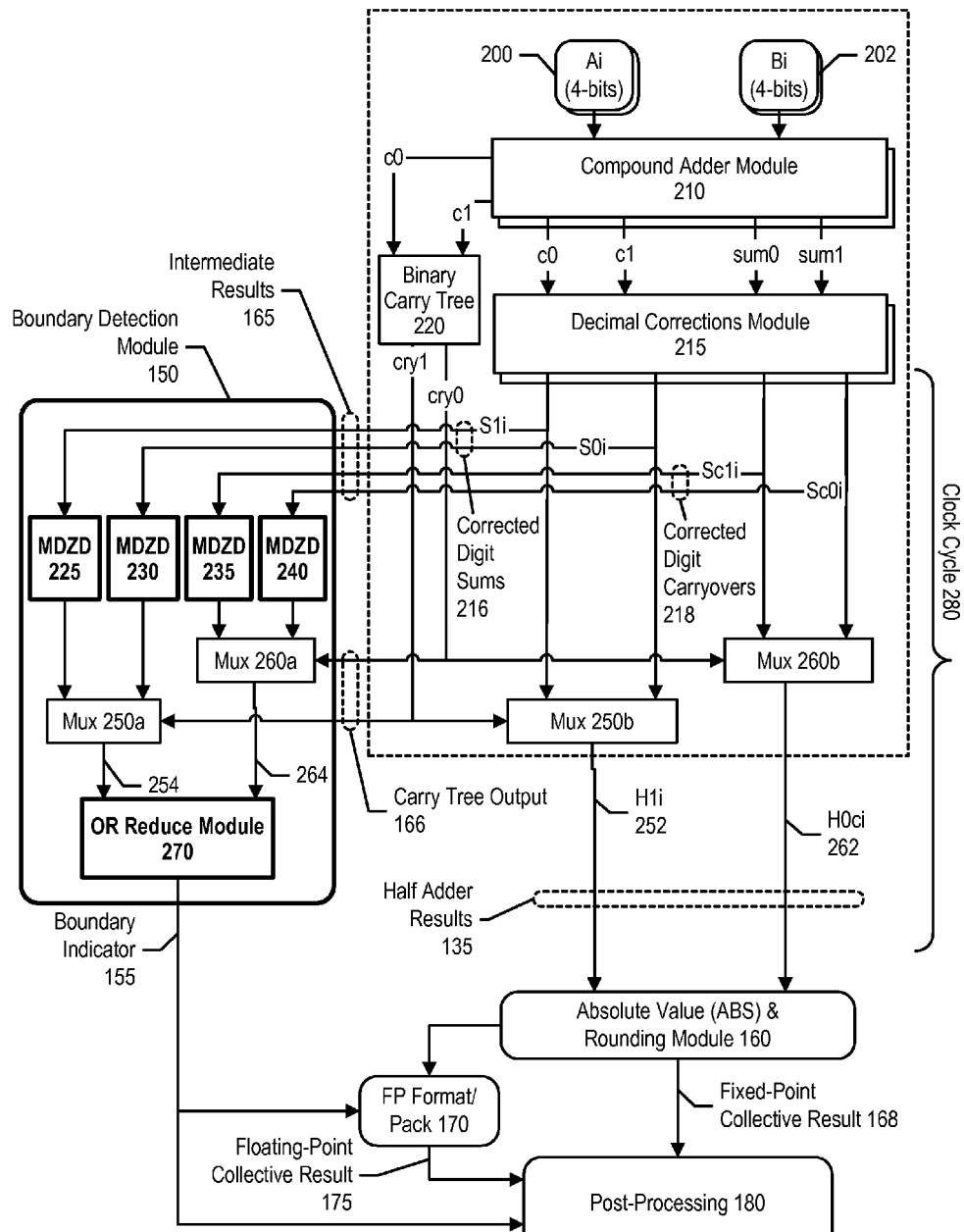
FIG. 2 is a diagram showing a detail diagram of a boundary detection module's various components that are integrated into an adder.

FIG. 2 is a diagram showing a boundary detection module's various components that are integrated into adder 110. Boundary detection module 150 includes masked digit zero detect (MDZD) modules 225-240 and OR reduce module 270. As can be seen, in one embodiment, these modules are integrated into adder 110 between decimal corrections module 215 and ABS and rounding module 160. As such, boundary detection module 150 generates boundary indicator 155 during the same clock cycle (clock cycle 280) that decimal corrections module 215 generates corrected digit sums 216 (S1$i$ and S0$i$) and corrected digit carryovers 218 (Sc1$i$ and Sc0$i$), which are included in intermediate results 165 shown in FIG. 1.

FIG. 2 includes a dashed box that outlines modules that are duplicated on a per-digit basis. In one embodiment, binary carry tree 220 may not be duplicated on a per-digit basis, but rather receives input from each per-digit module. For each digit, inputs 200 and 202 receive four bits corresponding to decimal data values "A" and "B," respectively. The bits are fed into compound adder module 210, which creates sum and carryover values. Sum0 is the summation of the bits a+b. Sum1 adds 1 to a+b to generate values for digit locations that have a carryover. Carryover 0 (c0) are carryover values on a per-digit basis for sum0, and carryover 1 (c1) are carryover values on a per-digit basis for sum 1. Compound adder module 210 feeds c0, c1, sum 0, and sum 1 into decimal corrections module 215 that, for example, adds six to the digits to correct for decimal-based data values.

Decimal corrections module 215 generates corrected digit sums 216 S0$i$ (sum0 corrected) and, S1$i$ (sum1 corrected), and also generates corrected digit carryovers 218 Sc0$i$ (c0 corrected), and Sc1$i$ (c1 corrected). These values feed into masked digit zero detect (MDZD) modules 225-240, which perform various computations using a mask generated by boundary detection module 150 corresponding to boundary precision value 140 (see FIGS. 6A, 6B, 7A, 7B, and corresponding text for further details). These values on a per-digit basis are muxed into mux 250$a$ and 260$a$ to form digit-wise 0 array 264 and digit-wise 1 array 254. Mux 250$b$ and 260$b$ mux the intermediate results into half-adder results 135 that include half-adder carryover result 0 262 and half-adder sum result 1 252, which are sent to ABS and rounding module 160.

OR reduce module 270 receives digit-wise 0 array 264 and digit-wise 1 array 254 and reduces the arrays into boundary indicator 155. In one embodiment, OR reduce module 270 inverts the boundary indicator 155 during floating-point operations (see FIGS. 5, 7, and corresponding text for further details).

Figure 3A:
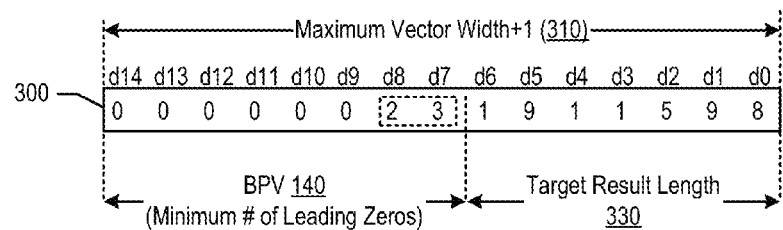
FIG. 3A is a diagram illustrating a minimum number of leading zeros for a fixed point operation to not overflow based upon a maximum vector length and a target result length.

FIG. 3A is a diagram illustrating a minimum number of leading zeros required in a fixed point operation to avoid an overflow condition based upon a maximum vector length and a target result length. Pre-processing 120 computes boundary precision value (BPV) 140 based upon a maximum vector width and a target results length. FIG. 3A shows collective result 300, which is the sum of two data values. Pre-processing 120 adds 1 to the maximum vector width (for allowable carryover), which represents digits d0-d14 (15 bytes). Target results length 330, which is identified in instructions 115, allows seven digits (digits d0-d6). As such, digits d7-d14 should include 0's in order to prevent an overflow condition, which pre-processing 120 computes as boundary precision value (BPV) 140. The example illustrated in FIG. 3A shows that the boundary precision value is 15−7=8 digits. In turn, boundary detection module 150 generates a mask that includes 1's in the first 8 digits of the mask.

Figure 3B:
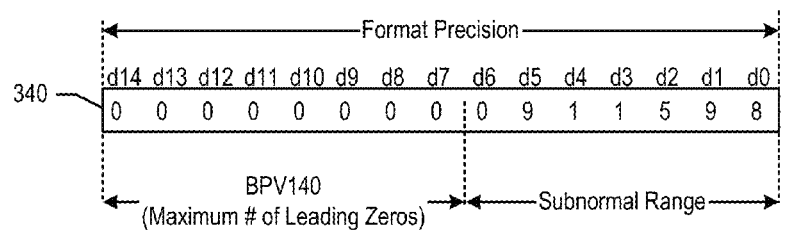
FIG. 3B is a diagram showing a maximum number of leading zeros allowed for a floating point operation to not underflow based upon a mantissa value and an underflow boundary corresponding to the data.

FIG. 3B is a diagram showing a maximum number of leading zeros allowed for a floating point operation based upon a mantissa value and an underflow boundary corresponding to the data. Data 118 includes exponent parts of the operand data that is used to determine the exponent part of the result. If $E_{min}$ is the smallest possible result exponent (based on the format that is determined from Instructions 115) in the format and $E_{result}$ is the exponent of the result, then an underflow condition exists if the result mantissa contains more leading zeros then $E_{result}-E_{min}$. The number of leading zeros in the mantissa (BPV 140) is determined by the format width (based on the format that is determined from instructions 115) and the number of non-zero result digits in the mantissa.

FIG. 4 is a flowchart showing steps taken during a fixed-point arithmetic operation to identify an overflow condition. Processing commences at 400, whereupon pre-processing module 120 receives processor configuration parameters from caches 105 and identifies a maximum vector width (MVW) at step 410. The maximum vector width, in one embodiment, may correspond to a 32-bit, 64-bit, or 128-bit architecture depending on the processor configuration.

At step 420, pre-processing module 120 receives a target results length from instruction decode 415 (based upon instructions 115). The target results length indicates the permitted length of the collective of the arithmetic computation. At step 430, pre-processing module 120 computes boundary precision value 140 by adding 1 (for carryover) to the maximum vector width and subtracting the target results length. Boundary precision value 140 indicates the minimum number of permitted leading zeros for the collective result to not have an overflow condition. For example, assuming the maximum vector width is 8 digits and the target results length is 5 digits, the boundary precision value is 8+1−5=4 digits. In this example, the collective result should have at least four leading zeros in order to avoid triggering an overflow condition.

Detection module 150 generates a mask where each bit of the mask corresponds to a digit in the dataflow, that includes the number of leading 1's equal to the boundary precision value at step 440. At step 450, detection module 150 receives intermediate results 165 (sum 0 array and sum 1 array) and performs a masked digit zero detect (MDZD) computation on each sum array to generate digit-wise arrays. The MDZD computation includes generating a non-zero digit array for each sum array and individually AND'ing the non-digit zero arrays with the mask (see FIGS. 6A, 6B, and corresponding text for further details).

At step 460, detection module 150 OR reduces the two digit-wise arrays generated at step 450 based upon the intermediate results' carryover arrays (carryover 0 array and a carryover 1 array) to generate the boundary indicator. The carryover arrays indicate which digit from the MDZD arrays to take into account when evaluating overflow. The outcome of the OR reduce is a combination of each of the selected digits included in the MDZD results(see FIG. 6B and corresponding text for further details).

Detection module 150 provides boundary indicator 155 to post processing module 180 at step 470, which informs post-processing as to whether fixed-point collective result 168 generates an overflow condition.

A determination is made as to whether to continue processing instructions (decision 480). If the adder should continue processing instructions, decision 480 branches to the "Yes" branch, which loops back to process more instructions 115. This looping continues until processing terminates, at which point decision 480 branches to the "No" branch, whereupon processing ends at 490.

Figure 5:
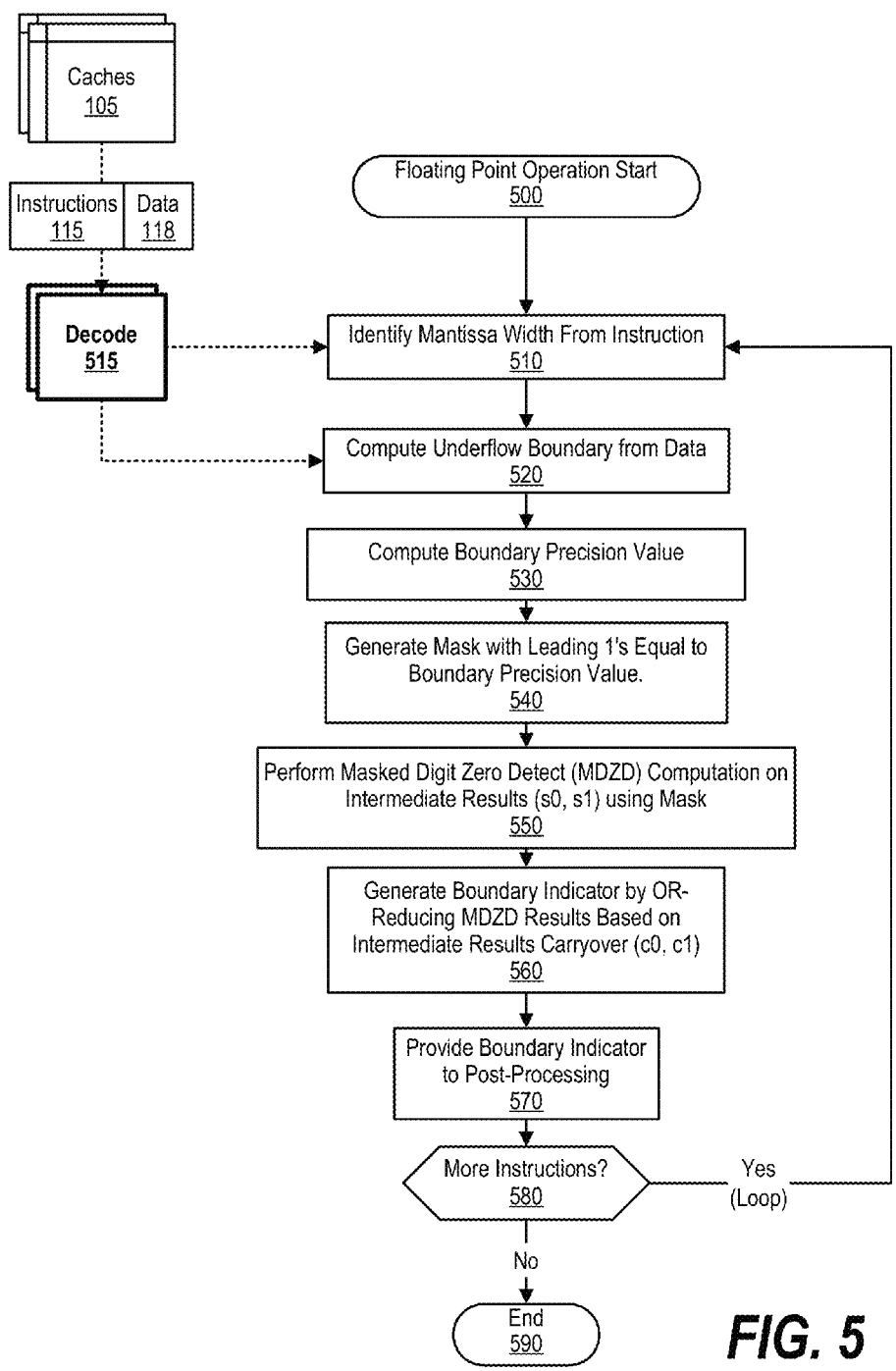
FIG. 5 is a flowchart showing steps taken during a floating point arithmetic operation to identify an underflow condition.

FIG. 5 is a flowchart showing steps taken during a floating point arithmetic operation. Processing commences at 500, whereupon pre-processing module 120 identifies the mantissa width from decode 515 (extracted from instructions 115) corresponding to an operation's collective result (step 510). Floating-point operations typically maintain the same mantissa length (double precision, extended precision, etc.) and adjust the exponent value accordingly. At step 520, pre-processing module 120 computes an underflow boundary based upon data 118 decoded by decode 515.

Pre-processing module 120 computes boundary precision value 140 at step 530, which indicates the permitted amount of leading zeros for the collective result of the arithmetic operation for an underflow condition to not have been met. In floating-point operations, boundary precision value 140 indicates the minimum number of permitted leading zeros for the result value for underflow to occur. (see FIGS. 7A, 7B, and corresponding text for further details).

Detection module 150 generates a mask where each bit of the mask corresponds to a digit in the dataflow, that includes the number of leading 1's equal to the boundary precision value at step 540. At step 550, detection module 150 receives intermediate results 165 and performs a masked digit zero detect (MDZD) computation, which includes generating a non-zero digit array based on the intermediate results (sum0 array and sum1 array) and AND'ing the non-digit zero array with the mask to generate digit-wise arrays (see FIGS. 7A, 7B, and corresponding text for further details).

At step 560, detection module 150 OR reduces the two digit-wise arrays from step 550 based upon the intermediate results' carryover arrays (carryover 0 array and a carryover 1 array) to generate the boundary indicator. The carryover arrays indicate which digit from the MDZD arrays to take into account when evaluating underflow conditions (see FIG. 7B and corresponding text for further details).

In turn, detection module 150 provides boundary indicator 155 to post processing module 180 at step 570, which informs post-processing as to whether floating-point collective result 175 generates an underflow condition.

A determination is made as to whether to continue processing instructions 115 (decision 580). If the adder should continue processing instructions 115, decision 580 branches to the "Yes" branch, which loops back to process more instructions. This looping continues until processing terminates, at which point decision 580 branches to the "No" branch, whereupon processing ends at 590.

Figure 6A:
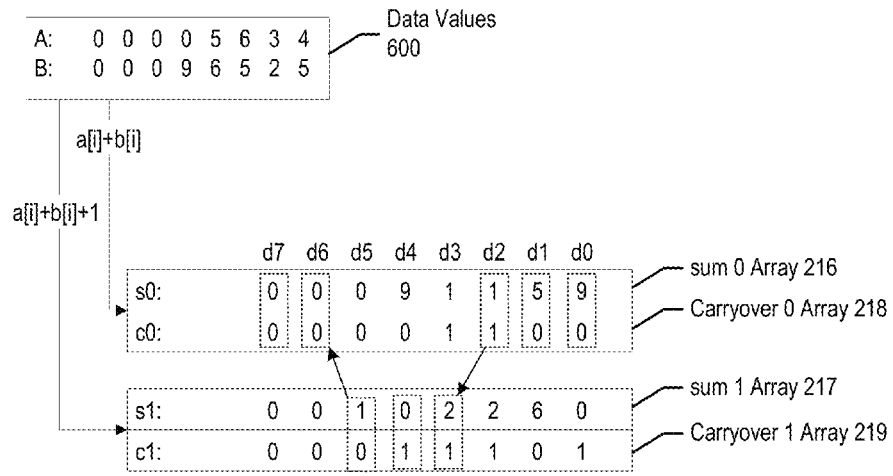
FIG. 6A is a diagram showing sum arrays and carryover arrays that include intermediate results during a fixed-point operation.

FIG. 6A is a diagram showing sum arrays and carryover arrays that include intermediate results during a fixed-point operation. Adder 110 adds decimal data values 600 (A+B). Referring to FIG. 2, each digit of data values 600 feeds into a different set of blocks 200 and 202. For example, data value A's digit 0 "4" feeds into block 200 as a binary coded decimal (BCD) representation and data value B's digit 0 "5" feeds into block 202 as a BCD representation.

Decimal Corrections Module 215 generates intermediate results that are included in arrays 216-219 and fed into MDZD modules 225-240. Sum 0 array 216 is the summed value of A and B, while carryover 0 array 218 includes the carryover values for each digit corresponding to sum 0 array 216. Sum 1 array 219 is the summed value of A and B plus 1 (for carryover digits), and carryover 1 array 219 includes the carryover values for each digit corresponding to sum 1 array 219.

FIG. 6A included dashed boxes and arrows that show the process by which adder 110 determines whether to select a digit from sum 0 array 216 (no carryover) or from sum 1 array 218 (carryover) for each digit location (d0-d7). As can be seen, carryover 0 array 218 includes a "0" in digits d0 and d1, indicating that the first three digits of sum 0 array 216 are valid. Since the digit d2 of carryover 0 array 218 is "1,"

indicating a carryover to digit d3, sum 1 array 217's digits are valid until carryover 1 array 219's values are no longer "1."

The example in FIG. 6A also shows that carryover 1 array 219's digits d3 and d4 are "1," indicating that digits d4 and d5 of sum 1 array 217 are valid (in addition to digit d3). Since carryover 1 array 219's digit d5 is "0," digit d6 of sum 0 array 216 is valid. And, since the digit d6 of carryover 0 array 218 is "0," digit d7 of sum 0 array 216 is valid. Therefore, the valid digits for the collective result are obtained from locations d0-d2 and d6-d7 from sum 0 array 216, and locations d3-d5 from sum 1 array 217. As such, adder 110 analyzes the appropriate digits when computing the boundary indicator (see FIG. 6B and corresponding text for further details).

Figure 6B:
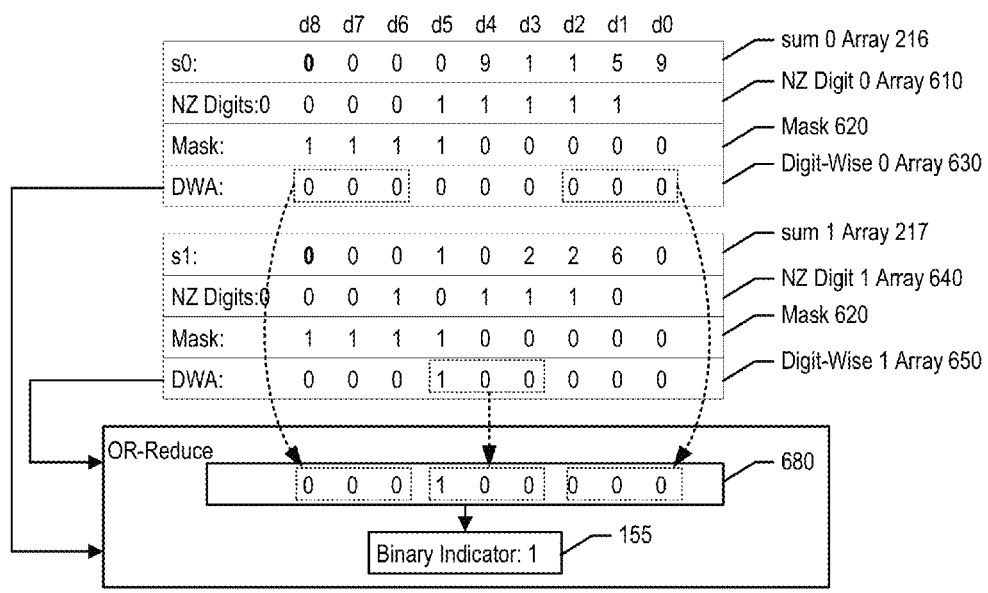
FIG. 6B is a diagram showing masked digit zero detect computations during a fixed-point operation to generate a boundary indicator.

FIG. 6B is a diagram showing masked digit zero detect computations during a fixed-point operation to generate a boundary indicator. Boundary detection module 150 analyzes sum 0 array 216 and generates non-zero digit 0 array 610, which includes a "1" in each digit location that sum 0 array 216 includes a non-zero digit (digits d0-d4).

Boundary Detection Module 150 generates mask 620 according to boundary precision value 140. Mask 620 indicates that the collective result should have a minimum of four leading zeros since digits d5-d8 include 1's. Boundary detection module 150 AND's mask 620 with non-zero digit 0 array 610 to generate digit-wise 0 array 630 (includes all 0's).

Similarly, regarding sum 1 array 217, boundary detection module 150 analyzes sum 1 array 217 and generates non-zero digit 1 array 640, which includes a "1" in each digit location that sum 1 array 217 includes a non-zero digit (digits d1-d3 and d5). Boundary detection module 150 AND's mask 620 with non-zero digit 1 array 640 to generate digit-wise 1 array 650. As can be seen, digit-wise 1 array 650 includes a "1" in digit location d5.

In turn, boundary detection module 150 OR-Reduces digit-wise 0 array 630 with digit-wise 1 array 650 based upon valid digits identified from carryover arrays 218-219 shown in FIG. 6A. FIG. 6B shows that OR array 680 includes digits d0-d2 and d6-d8 from digit-wise 0 array 630 and includes digits d3-d5 from digit-wise 1 array 650. Boundary detection module 150 reduces OR array 680 down to boundary indicator 155 by OR'ing each of the values. Since OR array includes a "1" in digit d5, the value of boundary indicator 155 is "1," indicating that adding data values 600 together generates an overflow condition.

FIGS. 6A and 6B show an example implementation where the carry arrays are evaluated and propagated on a digit basis, which may be referred to as ripple carry. As those skilled in the art can appreciate, the teachings of this disclosure may be implemented in other carry schemes that replace digits with groups of digits, such as carry-skip, carry-look-ahead, and etcetera.

Figure 7A:
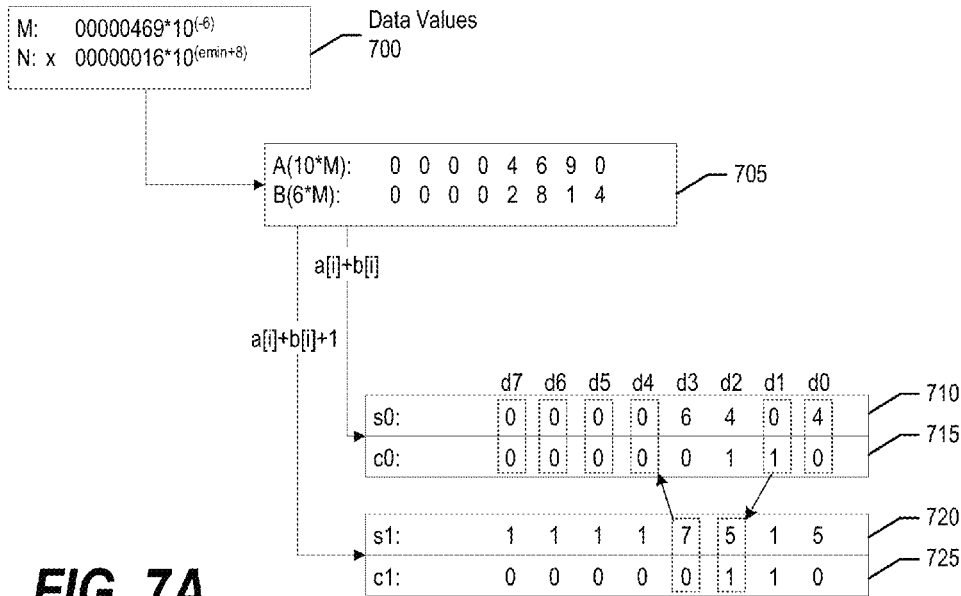
FIG. 7A is a diagram showing sum arrays and carryover arrays that include intermediate results during a floating-point operation.

FIG. 7A is a diagram showing sum arrays and carryover arrays that include intermediate results during a floating-point operation. Adder 110 multiplies data values 700 (M×N) by generating partial products and accumulating the partial products. Data values 700 include N, whose mantissa is 16 and, therefore, the partial product of M*10 is added to the partial product of M*6 (shown as partial product arrays 705).

Once partial product arrays 705 are computed, subsequent steps are similar to that discussed in FIGS. 6A and 6B to add the partial product arrays.

Decimal Corrections Module 215 generates intermediate results from partial product arrays 705, which are included in arrays 710-725 and fed into MDZD modules 225-240. Sum 0 array 710 is the summed value of A and B, while carryover 0 array 715 includes the carryover values for each digit corresponding to sum 0 array 710. Sum 1 array 720 is the summed value of A and B plus 1 (for carryover digits), and carryover 1 array 725 includes the carryover values for each digit corresponding to sum 1 array 720.

FIG. 7A included dashed boxes and arrows that show the process by which adder 110 determines whether to select a digit from sum 0 array 710 (no carryover) or from sum 1 array 720 (carryover) for each digit location (d0-d7). As can be seen, carryover 0 array 715 includes a "0" in digit d0, indicating that the first two digits of sum 0 array 710 are valid. Since the digit d1 of carryover 0 array 715 is "1," indicating a carryover to digit d2, sum 1 array 720's digits are valid until carryover 1 array 725's values are no longer "1."

The example in FIG. 7A shows that carryover 1 array 725's digit d2 is "1," indicating that digit d3 of sum 1 array 720 is valid (in addition to digit d2). Since carryover 1 array 725's digit d3 is "0," digit d4 of sum 0 array 710 is valid. And, since the digits d4-d6 of carryover 0 array 710 are "0," digits d5-d7 of sum 0 array 710 are valid. Therefore, the valid data values for the collective result of adding arrays 705 is obtained from digits d0-d1 and d4-d7 from sum 0 array 710, and digits d2-d3 from sum 1 array 725. As such, adder 110 knows which digits to analyze when computing the boundary indicator (see FIG. 7B and corresponding text for further details).

Figure 7B:
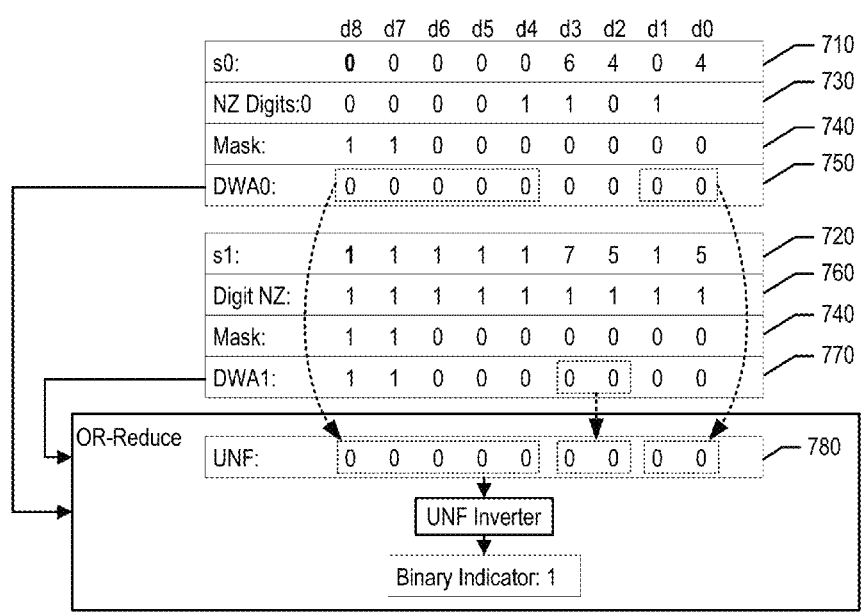
FIG. 7B is a diagram showing masked digit zero detect computations during a floating-point operation to generate a boundary indicator.

FIG. 7B is a diagram showing masked digit zero detect computations during a floating-point operation to generate a boundary indicator. Boundary detection module 150 analyzes sum 0 array 710 and generates non-zero digit 0 array 730, which includes a "1" in each digit location that sum 0 array 710 includes a non-zero digit (digits d0, d2, d3).

Boundary Detection Module 150 generates mask 740 according to exponent parts of the operand data 118 that is used to determine the exponent part of the result. Assuming $E_{min}$ is the smallest possible result exponent (based on the format that is determined from Instructions 115) in the format and $E_{result}$ is the exponent of the result, then an underflow condition exists if the result mantissa contains more leading zeros then $E_{result}-E_{min}$. The number of leading zeros in the mantissa is determined by the format width (based on the format that is determined from Instructions 115) and the number of non-zero result digits in the mantissa from FIG. 7A (see FIG. 3B and corresponding text for further details).

Mask 740 indicates that the collective result should have a maximum of two leading zeros since digits d7-d8 include 1's. Boundary detection module 150 AND's mask 740 with non-zero digit 0 array 730 to generate digit-wise 0 array 750 (includes all 0's).

Similarly, regarding sum 1 array 720, boundary detection module 150 analyzes sum 1 array 720 and generates non-zero digit 1 array 760, which includes a "1" in each digit location that sum 1 array 720 includes a non-zero digit (digits d0-d8). Boundary detection module 150 AND's mask 740 with non-zero digit 1 array 760 to generate digit-wise 1 array 770.

In turn, boundary detection module 150 OR-Reduces digit-wise 0 array 750 with digit-wise 1 array 770 based upon valid digits identified from carryover arrays 715 and 725 shown in FIG. 7A. FIG. 7B shows that OR array 780 includes digits d0-d1 and d4-d8 from digit-wise 0 array 750 and includes digits d2-d3 from digit-wise 1 array 770. Boundary detection module 150 reduces OR array 780 down to boundary indicator 155 by OR'ing each of the values. Since checking for underflow is opposite from checking for overflow (e.g., the intermediate results should have non-zero digits in checked locations versus not having non-zero digits in checked locations), boundary detection module 150 inverts the OR-reduce result. As such, since OR array 780 does not indicate a non-zero value in any of the digit locations, the inverted result is a "1", which indicates multiplying data values 700 generates an underflow condition.

FIGS. 7A and 7B show an example implementation where the carry arrays are evaluated and propagated on a digit basis, which may be referred to as ripple carry. As those skilled in the art can appreciate, the teachings of this disclosure may be implemented in other carry schemes that replace digits with groups of digits, such as carry-skip, carry-look-ahead, and etcetera.

Figure 8:
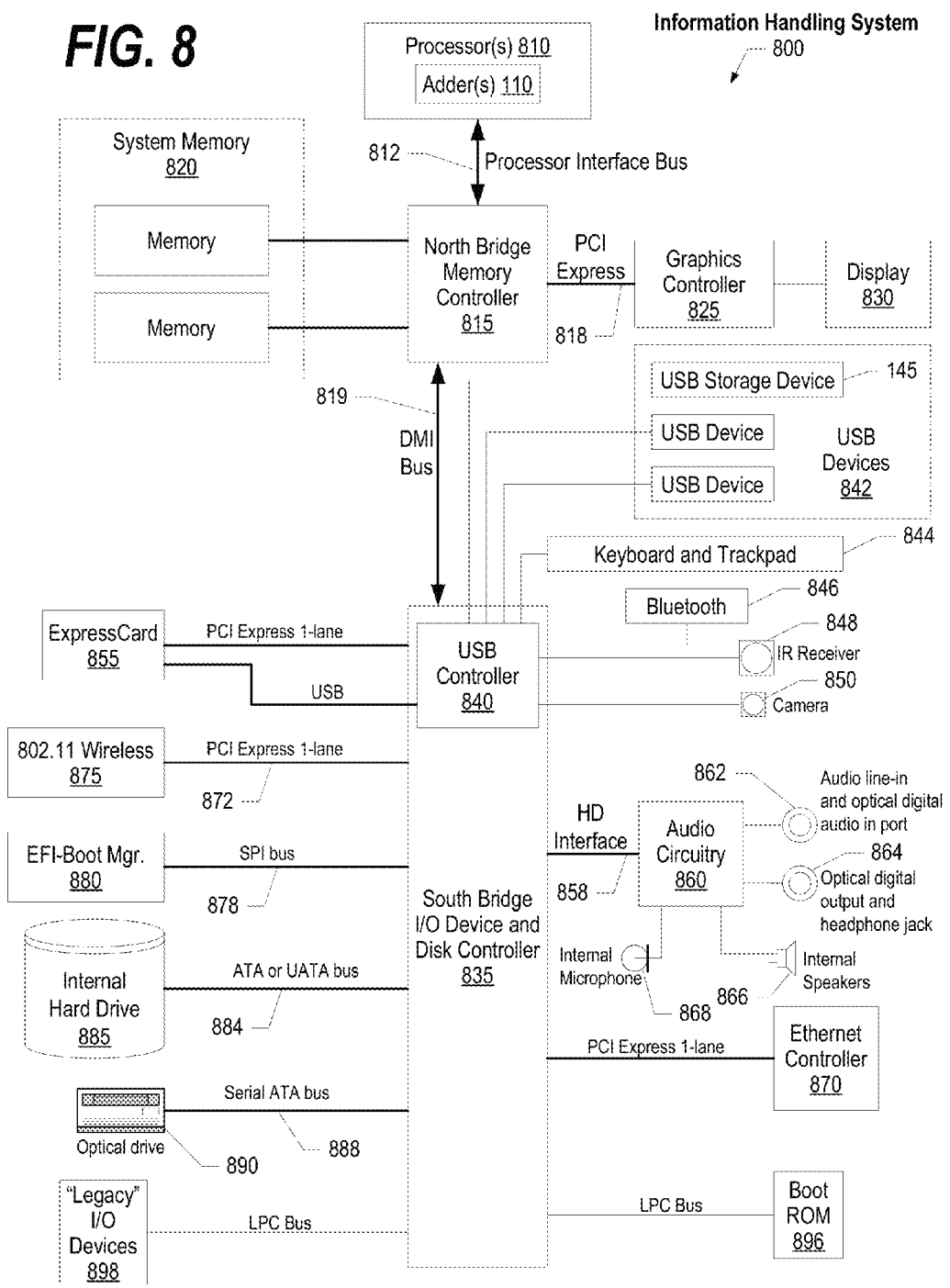
FIG. 8 is a block diagram of a data processing system in which the methods described herein may be implemented.

FIG. 8 illustrates information handling system 800, which is a simplified example of a computer system capable of performing the computing operations described herein. Information handling system 800 includes one or more processors 810 (includes one or more adder(s) 110) coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific data value of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A system comprising:
   a processor;
   one or more memories accessible by the processor, wherein the one or more memories stores one or more instructions; and
   an adder included in the processor that generates, based upon one or more of the instructions, a plurality of corrected digit sums and, utilizing the corrected digit sums, concurrently generates one or more half-adder results and a boundary indicator, wherein the adder generates a collective result from the one or more half-adder results, and wherein the boundary indicator indicates whether the collective result is within a boundary precision value.

2. The system of claim 1 wherein the adder performs the generation of the one or more half-adder results and the boundary indicator during one or more same clock cycles.

3. The system of claim 2 wherein the adder generates the collective result by combining the one or more half-adder results, which comprises a half-adder sum result and a half-adder carryover result, during one or more clock cycle subsequent to the one or more same clock cycles.

4. The system of claim 2 further comprising:
a mask generator included in the adder that generates a mask according to an amount of leading zeros permitted in the collective result.

5. The system of claim 4 wherein the plurality of corrected digit sums include a first sum array and a second sum array, the system further comprising:
a masked digit zero detect module included in the adder that combines the mask with the first sum array to produce a first digit wise array, and combines the mask with the second sum array to produce a second digit wise array.

6. The system of claim 5 further comprising:
an OR-Reduce module included in the adder that creates the boundary indicator by combining the first digit wise array with the second digit wise array based upon both a first carryover array and a second carryover array.

7. The system of claim 1 wherein, during a fixed point operation, the boundary indicator indicates whether the collective result corresponds to an overflow condition.

8. The system of claim 1 wherein, during a floating-point operation, the boundary indicator is based one or more operand exponents and indicates whether the collective result corresponds to an underflow condition.

9. The system of claim 1 wherein the adder is a decimal adder.

10. A computer-implemented method comprising:
receiving one or more instructions at one or more processors;
retrieving, by one or more of the processors, a first data value and a second data value corresponding to the received instructions; and
concurrently generating, by one or more of the processors, one or more half-adder results and a boundary indicator based upon the first data value and the second data value, wherein one or more of the processors generates a collective result from the one or more half-adder results, and wherein the boundary indicator indicates whether the collective result is within a boundary precision value.

11. The method of claim 10 wherein the one or more half-adder results and the boundary indicator are generated during one or more same clock cycles.

12. The method of claim 11 wherein the collective result is generated by combining the one or more half-adder results, which comprises a half-adder sum result and a half-adder carryover result, during one or more clock cycle subsequent to the one or more same clock cycles.

13. The method of claim 11 further comprising:
generating a mask according to an amount of leading zeros permitted in the collective result.

14. The method of claim 13 wherein the plurality of corrected digit sums include a first sum array and a second sum array, the method further comprising:
combining the mask with the first sum array to produce a first digit wise array; and
combining the mask with the second sum array to produce a second digit wise array.

15. The method of claim 14 further comprising:
creating the boundary indicatory by combining the first digit wise array with the second digit wise array based upon both a first carryover array and a second carryover array.

16. The method of claim 10 wherein the instruction is a fixed point operation, and wherein the boundary indicator indicates whether the collective result corresponds to an overflow condition.

17. The method of claim 10 wherein the instruction is a floating-point operation, and wherein the boundary indicator is based one or more operand exponents and indicates whether the collective result corresponds to an underflow condition.

18. The method of claim 10 wherein the first data value and second data value are decimal numbers.

19. An information handling system comprising:
one or more processors;
a memory coupled to at least one of the processors;
a set of computer program instructions stored in the memory and executed by at least one of the processors in order to perform actions of:
receiving one or more instructions at one or more processors;
retrieving, by one or more of the processors, a first data value and a second data value corresponding to the received instructions from the memory; and
concurrently generating, by one or more of the processors, one or more half-adder results and a boundary indicator based upon the first data value and the second data value, wherein one or more of the processors generates a collective result from the one or more half-adder results, and wherein the boundary indicator indicates whether the collective result is within a boundary precision value.

20. The information handling system of claim 19 wherein the one or more half-adder results and the boundary indicator are generated during one or more same clock cycles.

21. The information handling system of claim 20 wherein one or more of the processors perform additional actions comprising:
generating a mask according to an amount of leading zeros permitted in the collective result.

22. The information handling system of claim 21 wherein the plurality of corrected digit sums include a first sum array and a second sum array, and wherein one or more of the processors perform additional actions comprising:
combining the mask with the first sum array to produce a first digit wise array; and
combining the mask with the second sum array to produce a second digit wise array.

23. The information handling system of claim 22 wherein one or more of the processors perform additional actions comprising:
creating the boundary indicatory by combining the first digit wise array with the second digit wise array based upon both a first carryover array and a second carryover array.

24. The information handling system of claim 19 wherein the instruction is a fixed point operation, and wherein the boundary indicator indicates whether the collective result corresponds to an overflow condition.

25. The information handling system of claim 19 wherein the instruction is a floating-point operation, and wherein the boundary indicator is based one or more operand exponents and indicates whether the collective result corresponds to an underflow condition.

\* \* \* \* \*